(12) United States Patent
Kim et al.

(10) Patent No.: US 8,018,544 B2
(45) Date of Patent: Sep. 13, 2011

(54) FLAT PANEL DISPLAY AND METHOD FOR FABRICATING THE SAME

(75) Inventors: Chang-Soo Kim, Yongin (KR); Chang-Su Seo, Yongin (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 0 days.

(21) Appl. No.: 12/883,584

(22) Filed: Sep. 16, 2010

(65) Prior Publication Data
US 2011/0003408 A1  Jan. 6, 2011

Related U.S. Application Data

(62) Division of application No. 11/068,901, filed on Mar. 2, 2005, now Pat. No. 7,817,216.

(30) Foreign Application Priority Data

Mar. 9, 2004 (KR) .......................... 10-2004-0015940

(51) Int. Cl.
*G02F 1/1333* (2006.01)
(52) U.S. Cl. .......................................... 349/40
(58) Field of Classification Search .................. None
See application file for complete search history.

(56) References Cited

U.S. PATENT DOCUMENTS

| 6,084,648 | A  | 7/2000  | Yeo           |
| 6,392,719 | B2 | 5/2002  | Kim           |
| 6,608,655 | B2 | 8/2003  | Matoba et al. |
| 6,636,279 | B2 | 10/2003 | Takasugi et al. |
| 6,930,732 | B2 | 8/2005  | Oh et al.     |
| 7,158,194 | B2 | 1/2007  | Lo et al.     |
| 2004/0257487 | A1 | 12/2004 | Lee et al. |

FOREIGN PATENT DOCUMENTS

| CN | 1196547 | 10/1998 |
| CN | 1222759 | 7/1999 |
| JP | 02-190820 | 7/1990 |
| JP | 11-095257 | 4/1999 |
| JP | 2002-108244 | 1/2002 |
| JP | 2003-069028 | 3/2003 |
| JP | 2003-156764 | 5/2003 |
| JP | 2004-038176 | 2/2004 |
| KR | 10-2002-0088446 | 11/2002 |

OTHER PUBLICATIONS

Non-Final Office Action of U.S. Appl. No. 11/068,901 issued on Mar. 17, 2008.
Final Office Action of U.S. Appl. No. 11/068,901 issued on Sep. 2, 2008.
Non-Final Office Action of U.S. Appl. No. 11/068,901 issued on Dec. 18, 2008.

(Continued)

*Primary Examiner* — Timothy L Rude
(74) *Attorney, Agent, or Firm* — H.C. Park & Associates, PLC

(57) ABSTRACT

A flat panel display, having an anti-electrostatic configuration, comprising a plurality of gate lines and data lines formed on an insulating substrate having an emission region and a pad portion, an anti-electrostatic wire initially coupling the gate lines, and an anti-electrostatic circuit coupled to a data line. The anti-electrostatic wire between a gate line and an adjacent gate line is subsequently cut by an opening for cutting the anti-electrostatic wire to electrically isolate the respective gate lines.

8 Claims, 4 Drawing Sheets

OTHER PUBLICATIONS

Final Office Action of U.S. Appl. No. 11/068,901 issued on Aug. 20, 2009.

Non-Final Office Action of U.S. Appl. No. 11/068,901 issued on Feb. 22, 2010.

Notice of Allowance of U.S. Appl. No. 11/068,901 issued on Jun. 17, 2010.

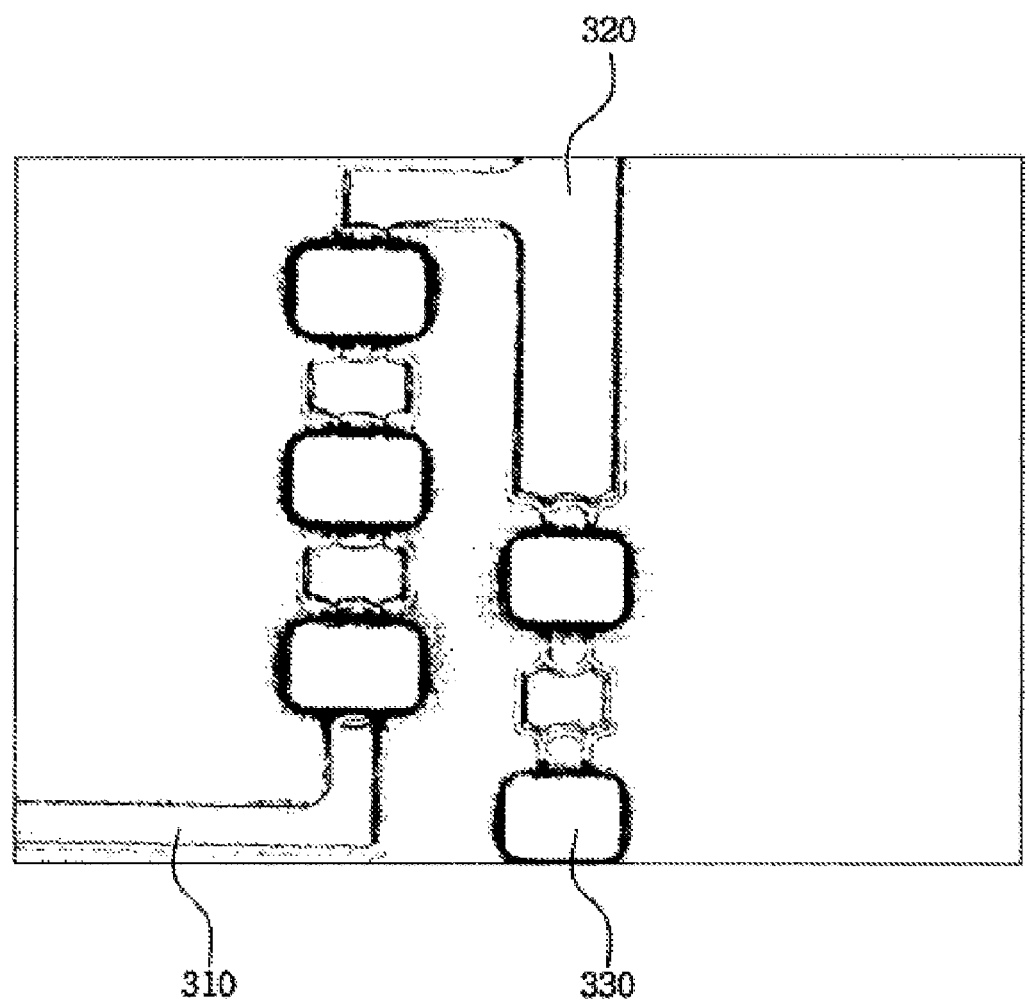

FLAT PANEL DISPLAY AND METHOD FOR FABRICATING THE SAME

CROSS-REFERENCE TO RELATED APPLICATIONS

This application is a divisional of U.S. application Ser. No. 11/068,901 filed on Mar. 2, 2005, and claims priority to and the benefit of Korean Patent Application No. 10-2004-0015940, filed Mar. 9, 2004, which are hereby incorporated by reference for all purposes as if fully set forth herein.

BACKGROUND OF THE INVENTION

1. Field of the Invention

The present invention relates to a flat panel display and method for fabricating the same and, more particularly, to a flat panel display having an anti-electrostatic configuration and method for fabricating the same.

2. Description of the Background

Generally, a cathode ray tube (CRT) has been typically used for televisions, monitors of measurement instruments, information terminals, and the like. However, the CRT may not satisfy a need for compact and lightweight electronic products because of its weight and size.

Flat panel display devices having compact and lightweight features have been attracting attention as substitutes for the CRT. Flat panel display devices include liquid crystal displays (LCD), organic electroluminescence displays (OLED), and other like displays.

The flat panel display may generally include a thin film transistor (TFT) substrate having a TFT and red, green and blue electroluminescent elements.

Such a flat panel display is typically manufactured by a TFT array process, which includes forming a TFT for applying a pixel signal, forming red, green and blue electroluminescent elements for implementing colors, and cutting to form cells of a unit flat panel display.

The cell cutting process may include a scribing process of forming a cutting line on the TFT substrate after forming the electroluminescent elements and a breaking process for cutting the TFT substrate along the cutting line by applying force.

The process of manufacturing the flat panel display may be primarily performed on an insulating substrate such as a glass substrate. The glass substrate may be very sensitive to static electricity since instantaneously generated charge cannot be electrically discharged down the substrate when the substrate is an insulator. Therefore, the static electricity may damage an insulating layer, the TFT or the electroluminescent elements formed on the insulating substrate.

The static electricity may have a very high voltage and a very low electric charge to locally deteriorate the substrate. Additionally, the static electricity may be largely generated during the cell cutting process of cutting the substrate, and mostly introduced through a pad portion of a gate line and a data line, where it may deteriorate a channel of the TFT.

FIG. 1 is a schematic plan view showing a TFT substrate of an conventional organic electroluminescent display.

Referring to FIG. 1, gate lines 110 and data lines 120 are formed orthogonally to each other on an insulating substrate. A switching TFT and a driving TFT (not shown) may be formed in pixel regions defined by the crossing gate and data lines 110, 120.

An anti-electrostatic wire 130, which may be referred to as a shorting bar, which binds the plurality of gate lines 110 and data lines 120, may be formed at edges of the substrate, i.e., at ends of the gate lines 110 and the data lines 120. The anti-electrostatic wires 130 may be electrically connected to each other.

Consequently, the gate lines 110 and the data lines 120 may be integrally connected to one another, and when static electricity is generated from the gate lines 110 or the data lines 120, it may be electrically discharged through the anti-electrostatic wire 130.

As the flat panel displays have become larger, their substrate area has also increased. Hence, this greater substrate area may generate static electricity having a relatively large electric charge. When a large electric charge is generated as described above, static electricity may be introduced into a channel of the TFT even with the presence of the anti-electrostatic wire.

SUMMARY OF THE INVENTION

The present invention provides a flat panel display having an anti-electrostatic configuration and method for fabricating the same that may have a more effective anti-electrostatic function.

Additional features of the invention will be set forth in the description which follows, and in part will be apparent from the description, or may be learned by practice of the invention.

The present invention discloses a flat panel display comprising a plurality of gate lines and data lines formed on a substrate, an anti-electrostatic wire initially coupling the gate lines, and an anti-electrostatic circuit coupled to a data line. The anti-electrostatic wire between a gate line and an adjacent gate line is subsequently cut by an opening.

The present invention also discloses a method for fabricating a flat panel display comprising forming a gate electrode and an anti-electrostatic wire on a first insulating layer, forming a second insulating layer having an opening exposing a portion of the anti-electrostatic wire, and forming a conductive layer. When the conductive layer is patterned to form source and drain electrodes, the portion of the anti-electrostatic wire exposed by the opening is removed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is an enlarged view of an anti-electrostatic wire between respective gate lines in FIG. 2.

DETAILED DESCRIPTION OF THE ILLUSTRATED EMBODIMENTS

Hereinafter, exemplary embodiments of the present invention will be described with reference to the accompanying drawings.

Figure 1:
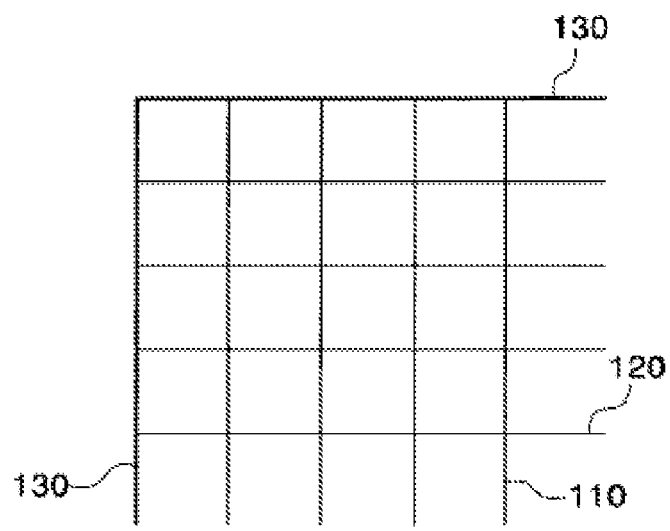
FIG. 1 is a schematic plan view showing a TFT substrate of an conventional organic electroluminescent display.
Figure 2:
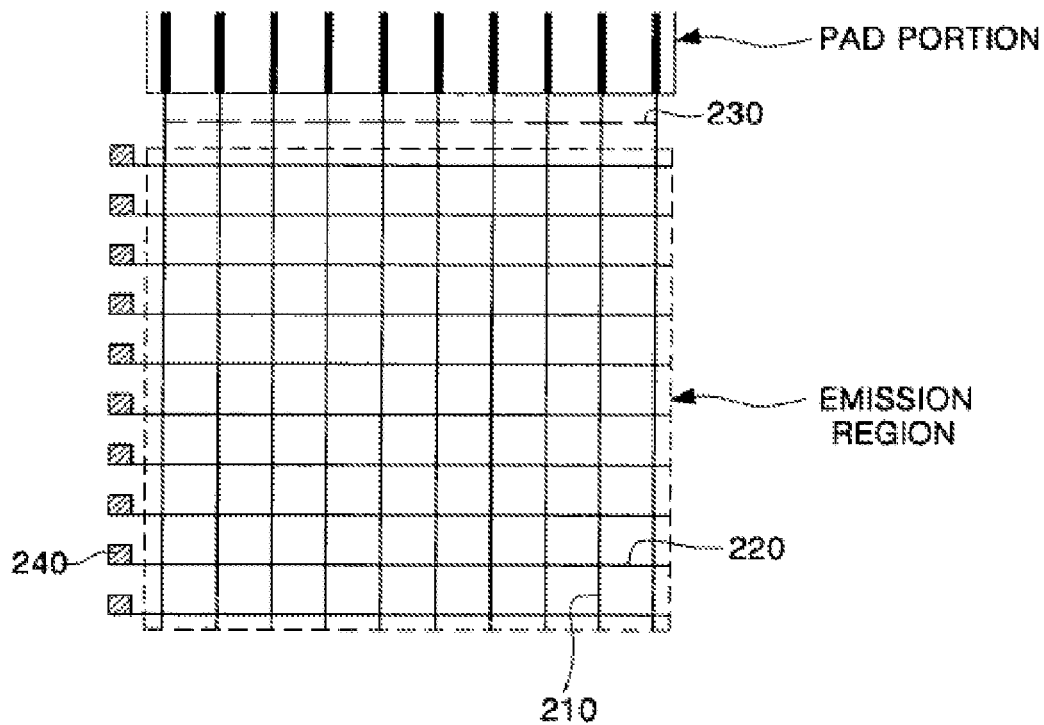
FIG. 2 is a schematic plan view showing a TFT substrate of a flat panel display provided with an anti-electrostatic configuration in accordance with an exemplary embodiment of the present invention.

FIG. 2 is a schematic plan view showing a TFT substrate of a flat panel display provided with an anti-electrostatic configuration in accordance with an exemplary embodiment of the present invention.

Referring to FIG. 2, a plurality of gate lines 210 and a plurality of data lines 220 may be formed in an emission region and extend into its periphery. The gate lines 210 may be formed in parallel with each other in a first direction, and the data lines 220 may be formed in parallel with each other in a second direction that is substantially perpendicular to the first direction.

Additionally, the data lines 220 may be coupled to anti-electrostatic circuits 240 at the periphery of the emission region. The anti-electrostatic circuits 240 may prevent static electricity generation during a process of manufacturing the flat panel display.

Although not shown, a switching TFT and a driving TFT may be formed in a pixel region defined by the gate line 210 and the data line 220.

An anti-electrostatic wire 230 may couple ends of the gate lines 210 to one another at the periphery of the emission region, i.e., a region between the emission region and the pad portion, thereby preventing static electricity generation during a process before the anti-electrostatic circuits are formed.

The anti-electrostatic wire 230 between one gate line 210 and an adjacent gate line 210 may be cut by at least one point.

FIG. 3 is an enlarged view of an anti-electrostatic wire between respective gate lines in FIG. 2.

Referring to FIG. 3, an anti-electrostatic wire 320 may be formed between one gate line 310 and an adjacent gate line 310. The anti-electrostatic wire 320 may be formed in at least two parallel lines, and it may be cut by at least one point by means of the opening 330. The opening 330 for cutting the anti-electrostatic wire 320 may be wider than the anti-electrostatic wire 320.

When the anti-electrostatic circuit is formed, the anti-electrostatic wire 320 may be cut, thereby electrically isolating the gate lines 310 from one another.

As described above, even though the anti-electrostatic wire 320 is cut, the anti-electrostatic circuit 240 may prevent static electricity generation during a process of manufacturing the flat panel display.

FIG. 4A, FIG. 4B, FIG. 4C, FIG. 4D and FIG. 4E are cross-sectional views showing a manufacturing process of a flat panel display having an anti-electrostatic configuration in accordance with an exemplary embodiment of the present invention.

Figure 4A:
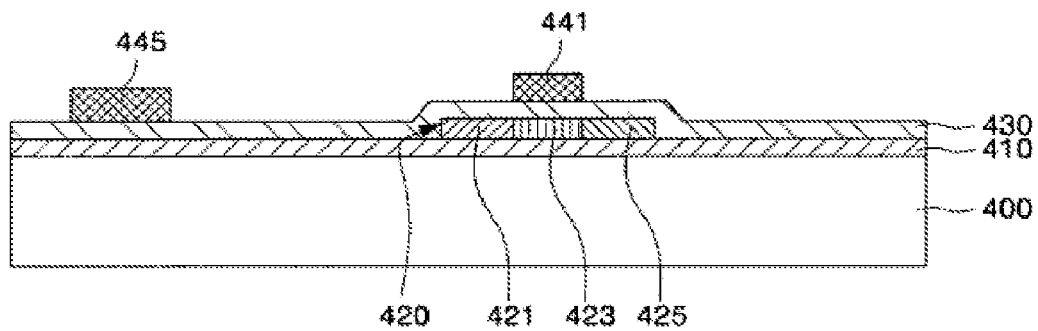
FIG. 4A, FIG. 4B, FIG. 4C, FIG. 4D and FIG. 4E are cross-sectional views showing a manufacturing process of a flat panel display provided with an anti-electrostatic configuration in accordance with an exemplary embodiment of the present invention.

Referring to FIG. 4A, a buffer layer 410 (diffusion barrier), which may prevent impurities such as metal ions from an insulating substrate 400 from diffusing and penetrating an active layer (polysilicon), may be deposited on the insulating substrate 400 by plasma enhanced is chemical vapor deposition (PECVD), low pressure chemical vapor deposition (LPCVD), sputtering, or other like methods.

After forming the buffer layer 410, amorphous silicon may be deposited on the buffer layer 410 by PECVD, LPCVD, sputtering, or other like methods. A dehydrogenation process may then be performed in a vacuum furnace. However, when the amorphous silicon is deposited by LPCVD or sputtering, the dehydrogenation process may not be performed.

The amorphous silicon may be crystallized by irradiating high energy to the amorphous silicon to thereby form a polycrystalline silicon (poly-Si) layer. The crystallization process may be performed by excimer laser annealing (ELA), metal induced crystallization (MIC), metal induced lateral crystallization (MILC), sequential lateral solidification (SLS) or solid phase crystallization (SPC).

After forming the poly-Si layer, it may be patterned to form an active layer 420.

Next, a gate insulating layer 430 may be deposited on the active layer 420, and a conductive metal layer may be deposited on the gate insulating layer 430 and patterned to form a gate electrode 441. The gate electrode 441 may be made of at least one conductive layer. For example, the gate electrode 441 may be formed of a double conductive layer of MoW/AlNd.

An anti-electrostatic wire 445 may be formed when the gate electrode 441 is formed, and it may be made of the same material as the gate electrode 441. The anti-electrostatic wire 445 may prevent static electricity generation during a process of manufacturing the flat panel display.

Next, impurities having a predetermined conductivity may be doped on the active layer 420 using the gate electrode 441 as a mask to form source and drain regions 421 and 425. A region of the active layer between the source and drain regions 421 and 425 acts as a channel region 423 of the TFT.

Figure 4B:
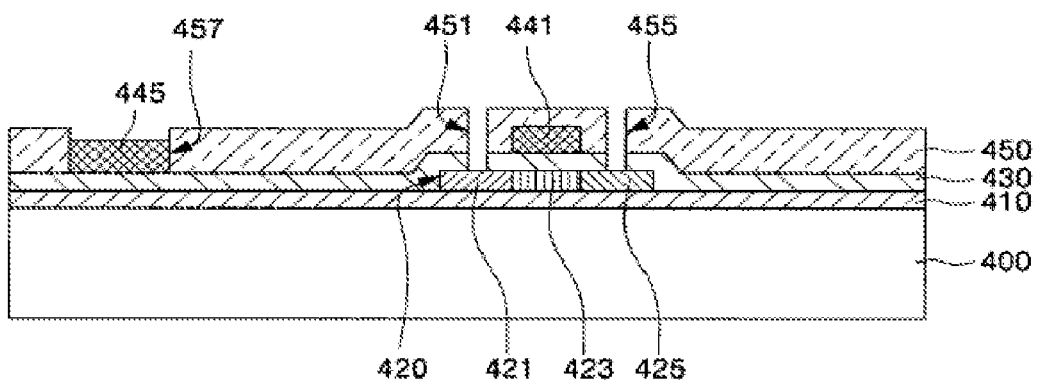

Referring to FIG. 4B, after forming the gate electrode 441 and the anti-electrostatic wire 445, an interlayer-insulating layer 450 may be formed on an entire surface of the insulating substrate 400 and patterned to form contact holes 451 and 455 exposing a portion of the source and drain regions 421 and 425.

An opening 457 exposing the anti-electrostatic wire 445 may also be formed while forming the contact holes 451 and 455. Additionally, when the gate electrode 441 and the anti-electrostatic wire 445 are made of at least two conductive layers, at least one conductive layer of an upper portion of the anti-electrostatic wire 445 may be etched. For example, when the gate electrode 441 and the anti-electrostatic wire 445 are made of a double conductive layer of MoW/AlNd, a MoW conductive layer may be removed by over etching while forming the opening 457.

The opening 457 may be as wide as, or wider than, the anti-electrostatic wire 445.

The opening 457 permits removal of the anti-electrostatic wire 445 during formation of the source and drain electrodes 461 and 465, thereby electrically isolating the respective gate lines.

Figure 4C:
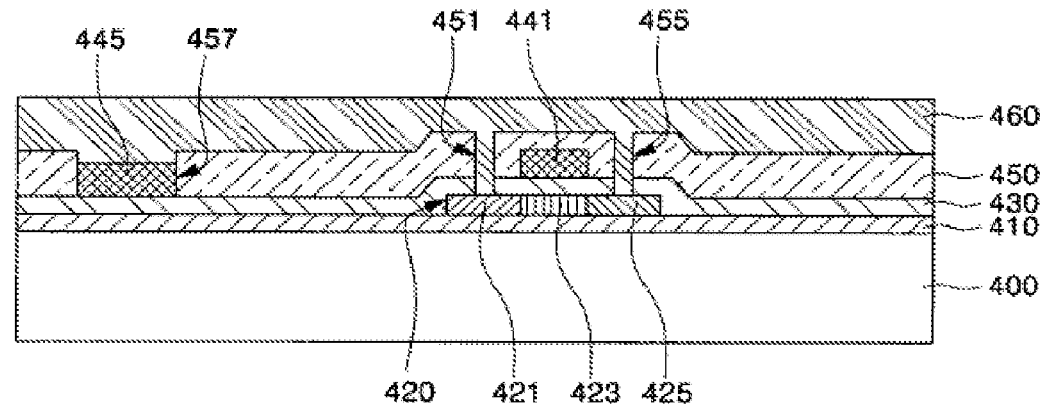

Referring to FIG. 4C, after forming the opening 457 and the contact holes 451 and 455, a conductive material may be deposited on the entire surface of the insulating substrate 400 to form a conductive material layer 460.

Figure 4D:
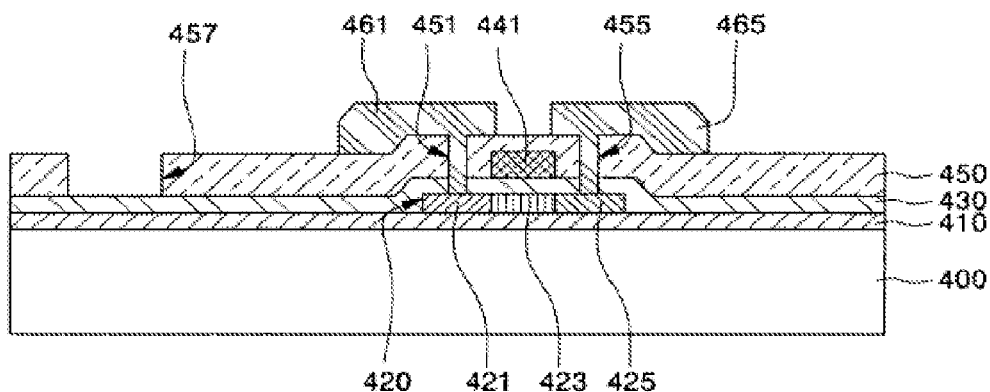

Referring to FIG. 4D, the conductive material layer 460 may then be etched to form the source and drain electrodes 461 and 465.

Additionally, while forming the source and drain electrodes 461 and 465, the anti-electrostatic wire 445 may be entirely etched and removed.

Figure 4E:
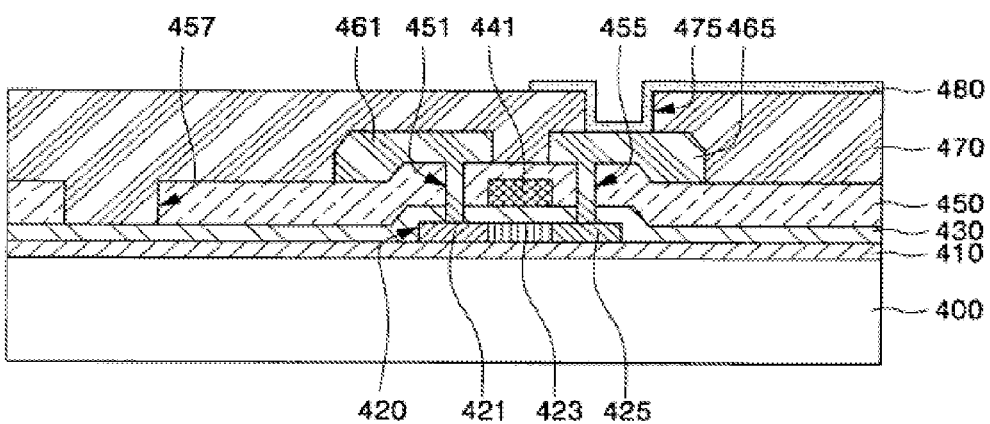

Referring to FIG. 4E, a passivation layer 470 may then be formed on the entire surface of the insulating substrate 400 and etched to form a via-hole 475 exposing a portion of either the source electrode 461 or the drain electrode 465. FIG. 4E shows the via-hole 475 exposing a portion of the drain electrode 465.

Next, a lower electrode 480 may be formed on the passivation layer 470 and be coupled to the drain electrode 465 through the via-hole 475.

Although not shown, hereinafter, a process of manufacturing a conventional flat panel display may be performed to form a flat panel display.

As described above, the present invention provides an anti-electrostatic circuit and an anti-electrostatic wire having a structure permitting the gate lines to be electrically isolated by cutting during a process of manufacturing the flat panel display without requiring a separate process of removing the anti-electrostatic wire, thereby performing a more effective anti-electrostatic function.

The present invention provides a flat panel display having an anti-electrostatic configuration and method of fabricating the same, which may perform a more effective anti-electrostatic function, by including an anti-electrostatic wire with a self cutting structure and an anti-electrostatic circuit, particularly in a large flat panel display.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a flat panel display, comprising:
    forming a gate electrode and an anti-electrostatic wire on a first insulating layer;
    forming a second insulating layer having an opening exposing a portion of the anti-electrostatic wire;
    forming a conductive layer;
    patterning the conductive layer to form a source electrode and a drain electrode while removing the portion of the anti-electrostatic wire exposed by the opening; and
    forming a passivation layer on the source electrode and the drain electrode,
    wherein the passivation layer contacts the source electrode, the drain electrode, and the first insulating layer.

2. The method of claim 1, wherein the gate electrode and the anti-electrostatic wire are made of a double conductive layer.

3. The method of claim 2, wherein the double conductive layer comprises an MoW layer and an AlNd layer.

4. The method of claim 3,
    where the Mow layer is formed on the AlNd layer; and
    wherein the MoW layer is removed while forming the opening.

5. The method of claim 1, wherein the opening is wider than the anti-electrostatic wire.

6. The method of claim 5, wherein when patterning the conductive layer, all of the anti-electrostatic wire exposed by the opening is removed.

7. The method of claim 1, further comprising forming the conductive layer on the second insulating layer.

8. The method claim 7, further comprising:
    forming an active layer in an emission region of a substrate having the emission region and a pad portion;
    forming source and drain regions in the active layer; and
    forming a first contact hole and a second contact hole in the second insulating layer exposing a portion of the source region and the drain region, respectively.

* * * * *